Feb. 16, 1932.   H. Y. NORWOOD   1,845,325
THERMOMETER
Filed Oct. 12, 1929
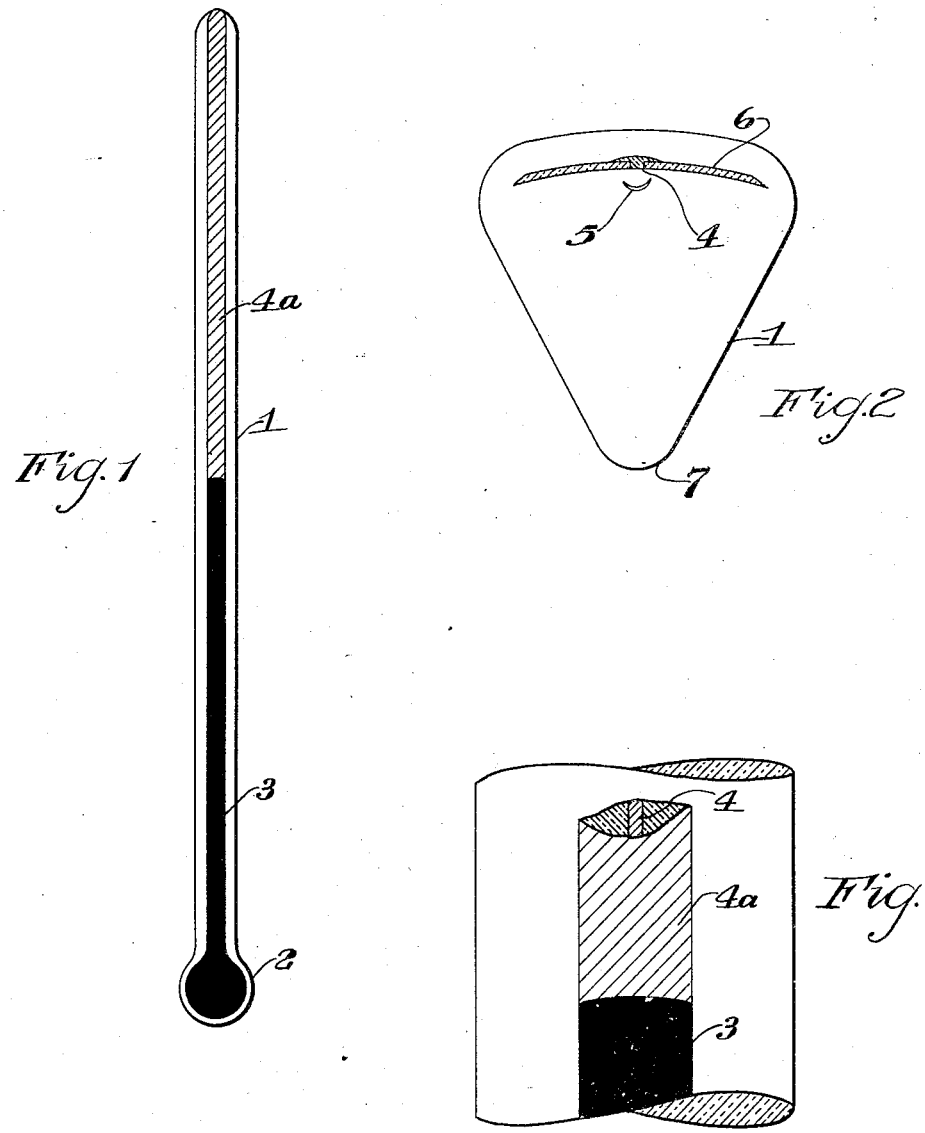
INVENTOR:
Harry Y. Norwood
BY
ATTORNEY Patented Feb. 16, 1932

1,845,325

UNITED STATES PATENT OFFICE

HARRY Y. NORWOOD, OF RUSH, NEW YORK, ASSIGNOR TO TAYLOR INSTRUMENT COMPANIES, OF ROCHESTER, NEW YORK, A CORPORATION OF NEW YORK

THERMOMETER

Application filed October 12, 1929. Serial No. 399,190.

This invention relates to thermometers having mercury as indicating liquid and more in particular to that type of thermometers in which a colored stripe is embedded in the glass stem behind the bore so as to appear above the mercury column and by color contrast indicate the index position of the column.

For a full understanding of the invention, reference is made to the accompanying drawings wherein Fig. 1 is an elevation of a thermometer embodying the invention;

Fig. 2 is an enlarged cross-section thereof; and

Fig. 3 is an enlarged fragmentary view of a thermometer stem having a part broken away to show the actual size of a part relatively to its magnified image.

Having reference to Fig. 1, 1 is the glass stem of a thermometer and 2 the usual bulb. The mercury 3 fills the bulb and a part of the stem and above the column of mercury appears the colored stripe 4a as magnified by the usual lenticular surface.

As appears from Fig. 2, the colored stripe 4 lies behind the bore 5 in symmetrical relation thereto. On both sides of the colored stripe is preferably disposed a white layer 6. The stem 1 has a lens front 7. The construction thus far described is old and well known. The layer 6 of enamel has the object of furnishing a light back ground, while the stripe 4 which is visually coextensive with the bore has the purpose of furnishing a maximum contrast. As a rule, this stripe 4 is red.

The invention lies in the shape of the bore 5. Heretofore the bore was of round or oval cross-section. In contradistinction hereto I make the bore of a crescent-shaped cross-section, the concavity of which faces in an opposite direction from the lens as shown.

By making the bore of such a cross-section, the refractive effect of the bore as a whole is practically nil, since the concave surface and the convex surface practically neutralize each other, whereas with a round bore or an oval bore of the usual construction the surfaces of the bore had a reducing effect.

The practical significance of this difference is this:

It is desirable, for enhancing the visibility of the mercury column and more in particular of the top of the mercury column, that the colored stripe as seen through the lens be substantially of the same width as the bore, as in the patent to Frankenberg No. 744,325.

With the old construction, due to the reducing effect of the bore, it is difficult to so place the colored stripe behind the bore and to make it of such width as to coincide in visual width with the bore. With my construction, the colored stripe may be of materially smaller width than the bore, as indicated in Fig. 2, while due to the combined effect of the bore 5 and the lens 7, the visual width of the stripe is equal to that of the bore. The width of the stripe may vary between relatively wide limits without materially affecting its visual width. Variation in width within the proper limits merely changes the intensity of the color effect as it appears to the eye. This latitude in regard to the width of the colored stripe is of considerable advantage in the manufacture of the tubing, since it is easy to stay within the practical limits required.

Fig. 3 shows approximately the relation of the stripe 4 and its visual image 4a as seen through the lens 7. While the stripe 4 is considerably narrower than the bore 5, its geometrical relation to the latter and the position of the stripe 4 and bore 5 relatively to the lens 7 are instrumental in producing the visual equality in width of the stripe and the mercury column filling the bore.

There is naturally some latitude also as regards the distance of the stripe 4 from the bore 5. However, due to the practical requirements that the cross-section of the bore must remain very small, the stripe 4 must always be relatively close to the bore.

I claim:

1. In a thermometer, a tubing having a crescent-shaped capillary bore and a colored stripe opposite the concave surface of said bore and having a width smaller than that of said bore.

2. In a thermometer, a tubing having a crescent-shaped capillary bore and a colored stripe facing the concave surface of said bore and in close proximity thereto, the stripe being of smaller width than the bore.

3. In a thermometer, a tubing having a crescent-shaped capillary bore, a colored stripe disposed behind the concave surface of said bore and in close proximity thereto, said stripe having a smaller width than said bore and a lens surface symmetrically disposed in front of the bore.

4. In a thermometer, a tubing having a lens front and a crescent-shaped capillary bore, the concavity of which is facing in the opposite direction from the lens front, and a colored stripe narrower than said bore and disposed immediately in back of the bore, said stripe being close to the axis of curvature of the concave surface of said bore.

5. In a thermometer, a tubing having a lens front and a crescent-shaped capillary bore, the concavity of which is facing in the opposite direction from the lens front, and a colored stripe disposed immediately in back of the bore and being of smaller width than the bore.

In testimony whereof I affix my signature.

HARRY Y. NORWOOD.